Oct. 26, 1965            J. MOLZ            3,214,152
PUSHER-TYPE FURNACE
Filed Oct. 2, 1963
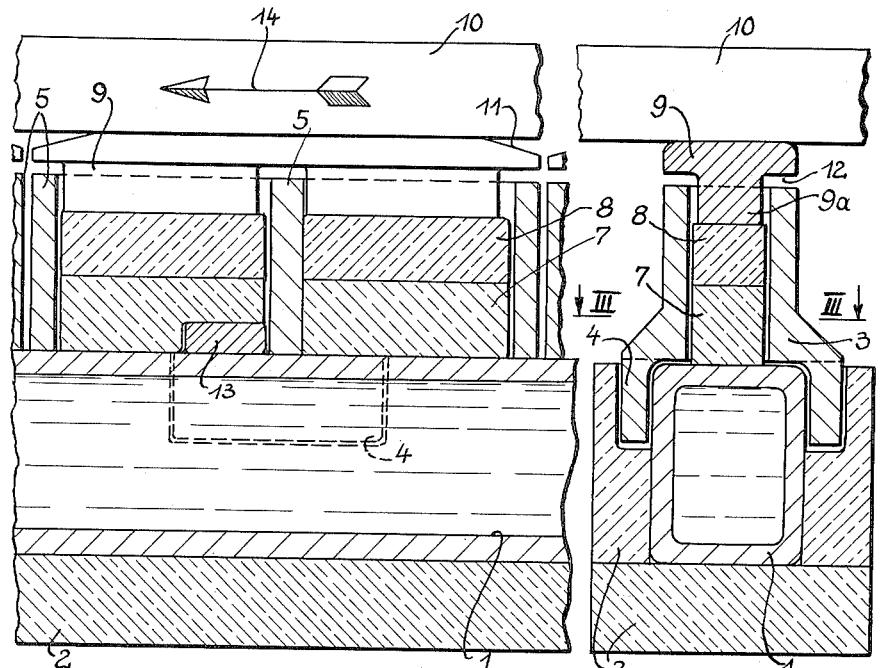
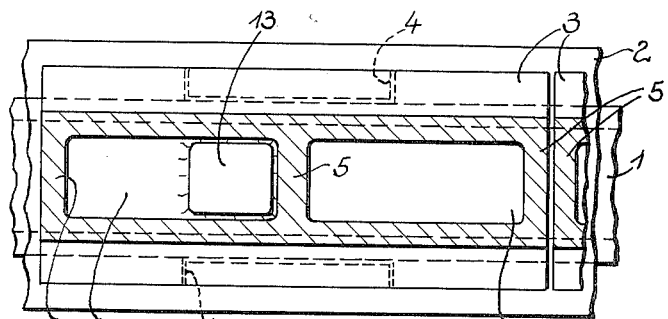
JOSEF MOLZ
INVENTOR.
BY    Michael J. Striker
ATTORNEY.

United States Patent Office 3,214,152
Patented Oct. 26, 1965

3,214,152
PUSHER-TYPE FURNACE
Josef Molz, Mulheim (Ruhr)-Menden, Germany, assignor to Wistra Ofenbau G.m.b.H., Dusseldorf, Germany
Filed Oct. 2, 1963, Ser. No. 314,091
Claims priority, application Germany, Oct. 4, 1962, W 33,068
10 Claims. (Cl. 263—6)

The present invention relates to heating installations such as furnaces in which the work material is subjected to extremely high temperatures.

In particular, the present invention relates to pusher-type furnaces in which the work material is moved through the furnace by being pushed therethrough, such furnaces being used for heating billets, for example.

In furnaces of this type it is known to provide cooled supporting means which carry members which in turn engage the work during movement of the latter through the furnace. These work-engaging members must of course be made of an extremely expensive material because on the one hand they must be capable of withstanding extremely high temperatures, on the order of 1300° C., and on the other hand they have to be capable of withstanding the pressure and wear of the work material sliding therealong so that there is no possibility of softening of the work-engaging members which would of course result in a considerable increase in the wear and would require very frequent replacing of the work-engaging members. Because the support beams are cooled the work-engaging members must be made large enough so that they have work-engaging surfaces spaced from the support beams by a distance great enough to guarantee that the cooling action in the supporting beam is not transmitted through the work-engaging member itself, so as to guarantee that at the area where the work-engaging member engages the work the same high temperature is maintained as around the remainder of the work so that the work will be uniformly heated around its entire exterior surface, including the surface which engages the work-engaging member.

It is, therefore, a primary object of the present invention to provide a structure of the above type which does not present the above difficulties with respect to the work-engaging members.

Thus, it is an object of the present invention to provide work-engaging members which are capable of supporting the work for sliding movement while pushed through the furnace while at the same time requiring far less material than conventional work-engaging members.

Another object of the present invention is to provide such work-engaging members which even though their volume and size is much smaller than has heretofore been possible nevertheless are capable of being very effectively heated so as to provide a uniform heating of the work over the entire area thereof including the area which engages the work-engaging members.

It is furthermore an object of the present invention to provide a structure of the above type which makes it essential only to make the work-engaging member of a relatively expensive high quality material while all of the rest of the components of the structure may be made of far less expensive materials.

Yet another object of the present invention is to provide for a structure of the above type a frame which holds the components of the structure in position without, however, requiring the frame itself to support any load or to be made of an expensive heat-resistant material.

It is also an object of the present invention to provide an inexpensive but nevertheless very efficient structure for supporting the work-engaging members.

Also, the objects of the present invention include a structure of the above type which makes it very easy to exchange the work-engaging members for new work-engaging members when, after a long period of use, the wear of the work-engaging members is such that they require replacement.

With these objects in view the invention includes, in a pusher-type furnace, an elongated hollow support beam adapted to contain a cooling fluid in its interior. A heat-resistant means is carried by the support beam at its upper surface and a work-engaging means of high heat conductivity and great resistance to wear is carried by the heat-resistant means to be insulated by the latter from the support beam while said heat-resistant means is compressed between the work-engaging means and the support beam during movement of work along the work-engaging means. Both the heat-resistant means and the work-engaging means are maintained in their proper positions by a frame of the invention which directly engages the support beam to be cooled thereby and which at the same time does not carry any of the load and furthermore does not in any way detract from the possibility of thoroughly heating the work-engaging member and rendering the latter easily replaceable when required.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary longitudinal sectional illustration of one possible embodiment of a structure according to the present invention;

FIG. 2 is a transverse sectional view of the structure of FIG. 1; and

FIG. 3 is a sectional plan view taken along line III—III of FIG. 2 in the direction of the arrows.

The furnace of the invention is conventional except for the details shown in the drawing and described below. Thus, the furnace includes an elongated horizontal supporting beam 1 which is hollow and made of any suitable metal, a fluid such as water being located in the beam 1 and circulating therethrough so as to cool the supporting beam 1. In addition, beam 1 is covered at its sides and at its bottom by the insulating material 2. The frame 3 is carried by the beam 1, this frame resting on the upper surface of the beam 1 and having a pair of elongated parallel spaced side walls extending longitudinally of the beam 1 and resting thereon. A pair of extensions 4 are integral with the side walls of the frame 3 and extend downwardly therefrom along the opposed side surfaces of the beam 1, which is of rectangular cross section, as indicated in FIG. 2, so that in this way the frame 3 is restrained against transverse movement with respect to the beam 1.

The frame 3 includes in addition transverse wall portions 5 which extend transversely across the beam 1 and which are spaced therealong, these transverse walls 5 being fixed to the longitudinal walls of the frame 3 as by being formed integrally therewith, and in this way the longitudinal and transverse walls of the frames 3 define pockets 6 which are open at their tops and bottoms. In the illustrated example each frame 3 is provided with a pair of pockets 6, and a series of frames are arranged next to each other along the beam 1, but it is to be understood that the frames could equally well be provided with but one pocket or with more than two pockets.

A heat-resistant means 7, 8 which includes at least one block of firebrick material is carried by beam 1 at its upper surface, and the heat-resistant means 7, 8 is located in each pocket 6. In accordance with a particular feature of the invention the heat-resistant means includes the pair of ceramic blocks 7 and 8 made of firebrick material and capable of withstanding considerable compression as well as of course very high temperatures. According to a particular feature of the invention the lower block 7 which directly engages the upper surface of the beam 1 has a density which is substantially less than the upper block 8.

A work-engaging means 9 is carried by the heat-resistant means 7, 8 and engages the work 10 which is pushed through the furnace in a manner well known in the art in the direction of the arrow 14 shown in FIG. 1. The work-engaging means 9 is made of a metal of extremely high heat conductivity and capable of withstanding very high temperatures without any possibility of softening, so that the work-engaging means 9 is made of an expensive material. As is apparent from FIG. 2 this work-engaging means 9 has a substantially T-shaped cross section provided with a lower portion 9a which is relatively narrow and extends into the pocket 6 resting directly on the block 8, while the upper wider portion of the work-engaging means 9 extends over the upper surface of the walls of the frame 3 without however engaging this upper surface so that a substantial space 12 (FIG. 2) is defined between the upper surface of the frame 3 and the work-engaging means 9, and the heating fluid can have free access to the space 12 for thoroughly heating the work-engaging means 9 so that the work 10 will be heated at its surface which engages the means 9 to the same extent as the areas of the work 10 which are directly exposed to the heating fluid. Moreover, it will be seen that because of the T-shaped cross section of the work-engaging member 9 any scale which separates from the exterior surface of the work 10 cannot have access to the interior of the pockets 6. The work-engaging means 9 may be made of a material which has a very high resistance to heat such as, for example, cobalt or molybdenum. The frame 3, on the other hand, can be cast from a metal which does not have a particularly high resistance to heat inasmuch as the frame 3 is cooled by contact with the cooled beam 1 and carries absolutely no load. Thus, as is apparent from FIGS. 1 and 2, the work 10 engages only the work-engaging means 9 which in turn transmits the weight of the work 10 through the heat-resistant means 7, 8 to the support beam 1, so that in this way the frame 3 does not participate in any way in support of the load. All that the frame 3 is required to do is to maintain the blocks 7, 8 and the work-engaging means 9 in their positions illustrated in FIGS. 1 and 2, and for this purpose the frame 3 is not stressed to any substantial degree and inasmuch as it is cooled by engagement with the beam 1 this member 3 need not be made of an expensive material.

Furthermore, it will be seen that at any time it is a simple matter to replace a work-engaging means 9 since it need only be raised out of the pockets 6.

The work-engaging means 9 is formed at its ends with the inclined surface portions 11 located at least at the end of each member 9 which is first engaged by the work. Thus, while the member 9 of FIG. 1 is shown as being provided with the inclined surface portions 11 at both ends, where the work 10 moves in the direction of the arrow 14 it would be necessary only to provide the inclined surface 11 at the right end of the member 9, as viewed in FIG. 1.

As was indicated above, the engagement of the extensions 4 of the side walls of the frame 3 with the supporting beam 1 serves not only to provide an effective cooling of the frame 3 but also to restrain the frame 3 against lateral movement with respect to the beam 1. In order to prevent longitudinal movement of the frame 3 the beam 1 fixedly carries at its top surface blocks 13 which respectively extend into one of the pockets of each frame 3 and engage one of the transverse walls 5 thereof. Thus, in the illustrated example the block 13 is in the left pocket 6 of the frame 3 shown in FIG. 1 and engages the intermediate wall 5 thereof. This construction is also clearly illustrated in FIG. 3 which shows how the right end of the block 13 engages the intermediate transverse wall 5 of the frame 3 to the left, as viewed in FIGS. 1 and 3, and in this way all of the structure is prevented from moving longitudinally along the beam 1 while the work 10 slides along the work-engaging means 9.

As is apparent from FIGS. 1 and 2, the height of the work-engaging member 9 is extremely small so that the work-engaging member 9 does not require a large amount of material and thus there is a considerable saving of cost because of the fact that a large work-engaging member 9 is not required. The ceramic heat-resistant blocks 7 and 8 situated between the work-engaging means 9 and the upper surface of the beam 1 are far less expensive than the work-engaging means 9 and make it unnecessary to extend the portion 9a thereof all the way down to the beam 1.

Because the lower firebrick blocks 7 are of lesser density than the upper blocks 8, a stepped, improved insulation between the high temperature of the heating fluid in the furnace and the cooled beam 1 is obtained.

It will be understood that each of the elements described above, or two or more together, may also find a useful application in other types of furnaces differing from the types described above.

While the invention has been illustrated and described as embodied in pusher-type furnaces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a pusher-type furnace, in combination, an elongated hollow support beam adapted to be cooled by a cooling fluid flowing through the interior of the hollow support beam; heat-resistant and heat-insulating means resting on, but otherwise unconnected to, said beam at an upper surface thereof; work-engaging means resting on, but otherwise unconnected to, said heat-resistant means, said work-engaging means providing an upper surface along which the work can slide while being pushed through the furnace and being made of a material of high heat conductivity and high wear resistance, the weight of the work compressing the heat-resistant means between said work-engaging means and said beam; and frame means maintaining said heat-resistant means and work-engaging means in position on said beam.

2. In a pusher-type furnace, in combination, an elongated hollow support beam adapted to be cooled by a cooling fluid flowing through the interior of the hollow support beam; heat-resistant and heat-insulating means resting on, but otherwise unconnected to, said beam at an upper surface thereof; work-engaging means resting on, but otherwise unconnected to, said heat-resistant means, said work-engaging means providing an upper surface along which the work can slide while being pushed through the furnace and being made of a material of high heat conductivity and high wear resistance, the weight of the work compressing the heat-resistant means between said work-engaging means and said beam; and frame means maintaining said heat-resistant means and work-engaging means in position on said beam, said frame means having no load-transmitting function and simply resting on said beam without carrying any load.

3. In a pusher-type furnace, in combination, an elongated hollow support beam adapted to be cooled by a cooling fluid flowing through the interior of the hollow support beam; heat-resistant and heat-insulating means resting on, but otherwise unconnected to, said beam at an upper surface thereof; work-engaging means resting on, but otherwise unconnected to, said heat-resistant means, said work-engaging means providing an upper surface along which the work can slide while being pushed through the furnace and being made of a material of high heat conductivity and high wear resistance, the weight of the work compressing the heat-resistant means between said work-engaging means and said beam; and frame means maintaining said heat-resistant means and work-engaging means in position on said beam, said frame means having no load-transmitting function and simply resting on said beam without carrying any load and said frame means directly engaging said beam to be cooled by contact with the latter.

4. In a furnace as recited in claim 1, said heat-resistant means including at least one block of firebrick located between said work-engaging means and said beam.

5. In a furnace as recited in claim 1, said heat-resistant means comprising a pair of firebricks located one on top of the other with the lower one of said firebricks engaging the beam and the upper one of said firebricks engaging said work-engaging means.

6. In a furnace as recited in claim 5, said lower firebrick having a density less than the density of said upper firebrick.

7. In a pusher-type furnace, in combination, an elongated substantially horizontal hollow supporting beam adapted to have a cooling fluid located in its interior; a frame carried by and resting on said beam, said frame including a pair of longitudinal side walls spaced from each other and extending longitudinally of said beam on top of the latter and a plurality of transverse walls spaced from each other along said beam and extending between and connected to said side walls to form a plurality of pockets therewith; at least one firebrick located in each pocket and having a top surface adjacent the upper surface of said longitudinal and transverse walls of said frame; and a work-engaging member of great wear resistance and high heat conductivity resting on said brick in each pocket, said work-engaging member having a substantially T-shaped cross section and including a lower portion of relatively small width engaging said brick in each pocket and spaced inwardly from the side and transverse walls of the frame and said work-engaging member having an upper wider portion extending over but spaced substantially from said upper surface of said walls of said frame to define with the latter a space into which the heating fluid of the furnace can flow so that the work-engaging member is thoroughly heated to apply to the work a substantially uniform temperature around the entire surface thereof even though part of the surface of the work is engaged by the work-engaging member.

8. In a pusher-type furnace, in combination, an elongated substantially horizontal hollow supporting beam adapted to have a cooling fluid located in its interior; a frame carried by and resting on said beam, said frame including a pair of longitudinal side walls spaced from each other and extending longitudinally of said beam on top of the latter and a plurality of transverse walls spaced from each other along said beam and extending between and connected to said side walls to form a plurality of pockets therewith; at least one firebrick located in each pocket and having a top surface adjacent the upper surface of said longitudinal and transverse walls of said frame, and a work-engaging member of great wear resistance and high heat conductivity resting on said brick in each pocket, said work-engaging member having a substantially T-shaped cross section and including a lower portion of relatively small width engaging said brick in each pocket and spaced inwardly from the side and transverse walls of the frame and said work-engaging member having an upper wider portion extending over but spaced substantially from said upper surface of said walls of said frame to define with the latter a space into which the heating fluid of the furnace can flow so that the work-engaging member is thoroughly heated to apply to the work a substantially uniform temperature around the entire surface thereof even though part of the surface of the work is engaged by the work-engaging member, said longitudinal side walls of said frame having downwardly depending extensions engaging side walls of said beam so that the frame cannot shift transversely of said beam and at the same time is in good heat-transferring engagement therewith to be cooled by the fluid in the interior of said beam.

9. In a pusher-type furnace, in combination, an elongated substantially horizontal hollow supporting beam adapted to have a cooling fluid located in its interior; a frame carried by and resting on said beam, said frame including a pair of longitudinal side walls spaced from each other and extending longitudinally of said beam on top of the latter and a plurality of transverse walls spaced from each other along said beam and extending between and connected to said side walls to form a plurality of pockets therewith; at least one firebrick located in each pocket and having a top surface adjacent the upper surface of said longitudinal and transverse walls of said frame; a work-engaging member of great wear resistance and high heat conductivity resting on said brick in each pocket, said work-engaging member having a substantially T-shaped cross section and including a lower portion of relatively small width engaging said brick in each pocket and spaced inwardly from the side and transverse walls of the frame and said work-engaging member having an upper wider portion extending over but spaced substantially from said upper surface of said walls of said frame to define with the latter a space into which the heating fluid of the furnace can flow so that the work-engaging member is thoroughly heated to apply to the work a substantially uniform temperature around the entire surface thereof even though part of the surface of the work is engaged by the work-engaging member; and a block fixed to said beam at an upper surface thereof and engaging a transverse wall of said frame to prevent longitudinal shifting of the latter on said beam.

10. In a pusher-type furnace, in combination, an elongated substantially horizontal hollow supporting beam adapted to have a cooling fluid located in its interior; a frame carried by and resting on said beam, said frame including a pair of longitudinal side walls spaced from each other and extending longitudinally of said beam on top of the latter and a plurality of transverse walls spaced from each other along said beam and extending between and connected to said side walls to form a plurality of pockets therewith; at least one firebrick located in each pocket and having a top surface adjacent the upper surface of said longitudinal and transverse walls of said frame; a work-engaging member of great wear resistance and high heat conductivity resting on said brick in each pocket, said work-engaging member having a substantially T-shaped cross section and including a lower portion of relatively small width engaging said brick in each pocket and spaced inwardly from the side and transverse walls of the frame and said work-engaging member having an upper wider portion extending over but spaced substantially from said upper surface of said walls of said frame to define with the latter a space into which the heating fluid of the furnace can flow so that the work-engaging member is thoroughly heated to apply to the work a substantially uniform temperature around the entire surface thereof even though part of the surface of the work is engaged by the work-engaging member; and a block fixed to said beam at an upper surface thereof and engaging a transverse wall of said frame to prevent longitudinal shifting of the latter on said beam, and said frame having extensions projecting downwardly from and fixed to said side walls thereof and engaging opposed side surfaces of said beam so that said frame also cannot shift laterally of said beam.

References Cited by the Examiner

UNITED STATES PATENTS

| | | | |
|---|---|---|---|
| 1,374,132 | 4/21 | Worth | 263—6 X |
| 2,105,838 | 1/38 | McCormick | 263—6 |

FOREIGN PATENTS

| | | |
|---|---|---|
| 1,074,041 | 3/54 | France. |

CHARLES SUKALO, *Primary Examiner.*

JOHN J. CAMBY, *Examiner.*